Nov. 1, 1932.   F. H. McBERTY   1,885,936
DUST CATCHING AND QUENCHING DEVICE
Filed April 26, 1930
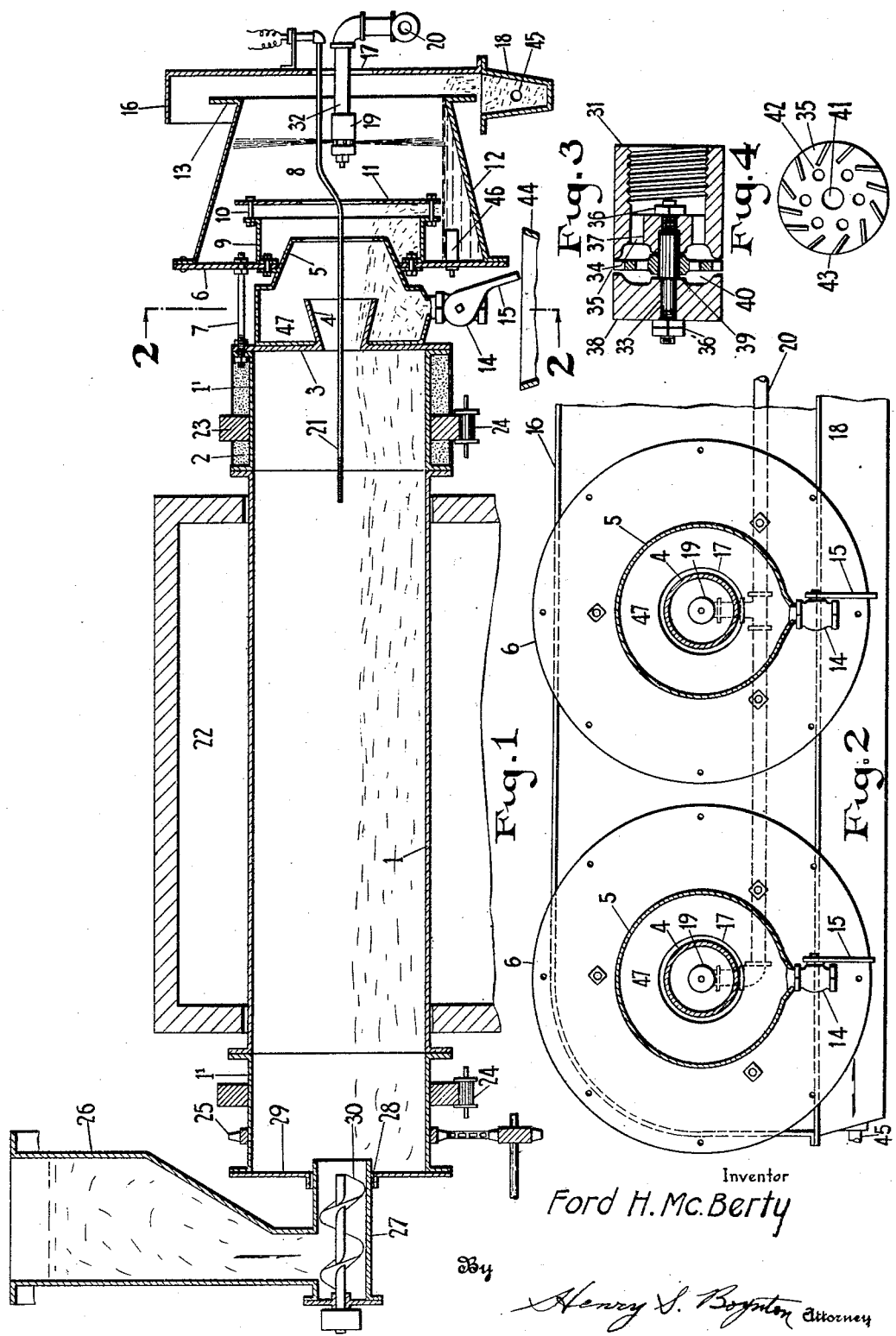
Inventor
Ford H. Mc.Berty
By
Henry S. Boynton Attorney Patented Nov. 1, 1932

1,885,936

UNITED STATES PATENT OFFICE

FORD H. McBERTY, OF WILMINGTON, DELAWARE, ASSIGNOR, BY MESNE ASSIGNMENTS, TO KREBS PIGMENT & COLOR CORPORATION, OF WILMINGTON, DELAWARE, A CORPORATION OF DELAWARE

DUST CATCHING AND QUENCHING DEVICE

Application filed April 26, 1930. Serial No. 447,735.

This invention relates to means for preventing the loss of dust from equipment used in the drying, calcining, and quenching of powdered or granular materials, and more particularly to means for obtaining this result when the drying or calcining operation is carried out under such conditions that the dust carrying gases contain appreciable quantities of condensable vapors, as in the calcining of lithopone and other pigments.

Fine dust, such as may result from the drying, calcination, or quenching of powdered or granular material, cannot readily be completely recovered from a dilute dispersion in a gas which is uncondensable at ordinary temperatures. Therefore, attempts to collect such dust in a gas stream, as by the use of hoods and exhaust fans, with resulting dilution of the condensable vapor, entail the use of elaborate dust catching equipment and the loss of an appreciable part of the dust so collected. The problem is rendered even more difficult, if, as is frequently the case, corrosive substances are present. The alternative procedure of conducting the dust laden gases and vapors without appreciable dilution to suitable collecting equipment located at a distance from the calcining operation frequently presents serious difficulties, such as the maintenance of sliding joints in the presence of high temperatures, corrosion and erosion, the clogging of pipes and ducts by the dust; and the necessity for providing satisfactory means for observing and controlling the progress of the operation producing the dust.

This invention has as an object to provide means for overcoming the above mentioned prior art difficulties. Another object is to provide means for collecting the dust produced when granular or powdered substances containing distillable liquids are heated above the distillation temperature of said liquids. A further object is the accomplishment of this result with minimum obstruction of visual and other means of control and with minimum equipment complications. A still further object is to provide a dust catching and quenching device which may be readily applied to rotary retorts used in the pigment industry for the calcination of lithopone and similar materials. It is also an object to provide a process for catching the dust arising from the calcination of lithopone and simultaneously quenching said lithopone. Other objects will appear hereinafter.

These objects are accomplished by the following invention which comprises causing the dust laden gases and vapors leaving the apparatus in which calcination or other heat treatment of a pigment is being carried on to pass at once, without substantial admixture of non-condensable gases, through a receptacle provided with a screen or spray of water or other liquid of such a nature and temperature that the dust is wetted by the spray liquid, mixes with it, and is thereby removed from the gas stream.

In order to accomplish passage of the dust laden gases through the desired liquid screen, a dust catching device adapted for attachment to a retort is provided consisting essentially of a conical or cylindrical member forming a dust and spray collecting chamber and also forming a receptacle for quenching the pigment which emerges from the retort. Disposed within and co-operating with this member is a nozzle or other device through which the dust collecting liquid passes, emerging in a comparatively fine circular spray and forming a liquid screen through which the dust laden gases must pass on their way out of the apparatus. In the calcination of lithopone, for example, the spray liquid falls into and is caught by said receptacle, forming a pool into which the main portion of the calcined material drops and is quenched thereby. The quenched lithopone, together with the dust entrained by the spray, forms with the spray liquid a slurry which continuously overflows from the receptacle and is conveyed away by suitable means.

The accompanying drawing, in connection with the following description, discloses a new method and a preferred apparatus for performing this new method, although various other forms of mechanical arrangements within the scope of the appended claims might be employed.

Figure 1 is a sectional side elevation showing the dust catching device mounted in operative position at the discharge end of a rotary retort.

Figure 2 is a vertical section on the line 2—2 of Figure 1, showing a battery of retorts provided with the device, receiving their spray liquid from a common source, as well as being provided with common means for conveying away the slurry formed during the dust catching and quenching operations.

Figure 3 is a detail sectional view showing the interior of the spray nozzle and its various co-operating members.

Figure 4 is a plan view of the runner forming part of the nozzle mechanism shown in Figure 3.

In the particular embodiment of the invention disclosed, the numeral 1 designates the cylindrical shell of a rotary retort or calcining tube which is partially covered with heat insulating material 2. The end of the tube 1 is partially closed by the diaphragm 3 provided with central funnel shaped orifice 4. Attached to the end of the tube 1 is the partly cylindrical, partly conical, member 5, which in turn carries the annulus 6, which is shown secured to the calcining tube extension 1' by the bolts 7 and forms the rear wall of the dust catching chamber 8. The conical portion of the member 5 is surrounded by cylindrical shield 9 bolted to the annulus 6. To the member 9 is attached by bolts and spacers 10 the annular baffle 11. To the annulus 6 is also bolted the frusto-conical member 12, the outer end of which is provided with annular lip 13. The inwardly projecting member 46, the function of which will be described hereinafter, is also fixedly secured to member 6.

The member 5 is provided with outlet valve 14, operated by hand lever 15. Rigidly mounted at the outer end of, but spaced from the member 12, is the hood 16 provided with circular opening 17 and carrying at its lower edge trough 18. The opening 17 is sufficiently large to permit ready visual observation of the interiors of both the dust catching chamber 8 and the calcining tube 1. Projecting through the opening 17 and preferably extending within the walls of the member 12 is the nozzle 19, attached by suitable pipe connections to the water supply pipe 20. Rigidly mounted on the hood 16 and projecting into and through the chamber 8 and well into the interior of the tube 1 is the pyrometer 21.

The tube 1 is rotatably mounted in a calcining furnace 22 by means of girth rings 23 fixed upon the cylindrical extensions 1' and contacting with supporting rollers 24. The tube 1 is rotated by means of sprocket 25 driven from a suitable source of power. Separately mounted at the intake end of the apparatus is the hopper or feed bin 26, provided at its lowermost end with a cylindrical discharge tube 27 disposed at right angles thereto. Tube 27 projects through, but does not make frictional contact with, flanged circular inlet opening 28 in plate 29 closing the intake end of cylindrical extension 1' of the calcining tube. Discharge tube 27 is provided with screw conveyor 30 for continuously moving the material contained in bin 26 into the interior of tube 1.

In Figure 2 there is shown a plurality of dust catching devices supplied by a common source of liquid dust catching agent, preferably water, and having a common hood 16 and trough 18 for conveying away the dust laden liquid or slurry formed in the receptacle 12.

Referring now to Figures 3 and 4 showing parts of the mechanism of the nozzle 19 of Figure 1, 31 is a cylindrical member threaded for attachment to the pipe connections 32 of liquid supply pipe 20 and recessed to receive the spindle 33 and also provided with perforations 34 to permit passage of the liquid to the runner 35 mounted to rotate about the spindle 33. Said spindle is screw threaded at both ends and provided with clamping nut 36, which holds the inner end of the spindle firmly within the spindle recess in the perforated wall 37. The nuts 36' rigidly hold the cap 38 against the shoulder 39 and spaced a sufficient distance from the wall 37 to permit rotary movement of the runner 35, thus providing a chamber 40 through which the liquid passes out of the nozzle.

The runner 35 is provided with a hole 41 through which the spindle passes, and perforations 42 which permit flow of liquid through the runner and into chamber 40 to equalize the pressure on the two sides of the runner, and thereby minimize end thrust. Around the circumference of the runner are tangential saw slots 43 which direct part of the liquid flowing out of the chamber 40 between the member 31 and the cap 38 in such a manner as to cause rotation of said runner.

The material to be calcined, which is generally in a moistened condition, is fed continuously into the calcining tube 1 from the bin 26 by means of screw conveyor 30 and flows slowly therethrough at a rate dependent upon the material undergoing treatment and the results desired. During its passage through the heated portion of the tube 1, dust laden gases and vapors are formed which flow out through the opening 4 in the diaphragm 3 at the end of the calcining tube extension 1', thence through the conical member 5, past baffle 11, and eventually find their way into the dust catching chamber 8.

The outer end of the chamber 8 is closed by a screen or spray of cool dust catching liquid, preferably water, which emerges from the nozzle 19 and impinges upon the inside walls of the member 12. In the spray chamber 8 the dust laden vapor is forced to pass through the spray of liquid emerging from the spray nozzle 19 and is cooled and condensed therein, while the dust itself is trapped by the liquid and carried down into the lower part of member 12 in which it forms a pool. The calcined material passing through the tube 1 eventually passes out through opening 4, partially fills chamber 47 and thence flows over shield 9, past baffle 11, into the pool of liquid contained in the receptacle 12.

On coming into contact with the body of cool liquid, the calcined material is quenched and, due to the rotation of the receptacle 12, a slurry is formed which eventually passes over the lip 13 and into the trough 18, from which it is conveyed away by the pipe 45. The member 46, by passing through the slurry once during each revolution of the retort, serves to break up any lumps of material which may have found their way into the receptacle 12, thus insuring the formation of a smooth slurry.

It is desirable to prevent caking of the pigment issuing from the member 5 which might otherwise be caused by cooling of the conical discharge end thereof. The shield 9 is therefore provided and by preventing any portion of the slurry which may be carried up on the walls of member 12 during its rotation from dropping upon the conical portion of 5 obviates the possibility of such undesired cooling. In order to further guard against cooling of the member 5, the annular baffle 11 is provided which serves to prevent splash occasioned, either by impinging of the spray against the walls of receptacle 12, or against the surface of the pool of liquid contained therein, from reaching the interior of the retort.

It will be apparent that the device of my invention has a double function, namely, that of collecting dust from the current of gases and vapors passing through the retort and that of quenching the calcined material.

If it should be desired to obtain the lithopone or other calcined material in a dry form, it is only necessary to open the valve 14, whereupon the dry material partially filling the chamber 47 will be discharged intermittently into the receptacle 44 when the valve reaches its lowermost position once during each revolution of the apparatus.

It is desirable at this point to discuss briefly the theoretical principles upon which the present invention is founded. When minute particles of any solid material come in contact with a condensable vapor at a temperature below the vaporization point, condensation occurs on their surfaces and the vapor ceases to exist as such, but as drops of liquid clinging to or surrounding the solid matter. Familiar examples of this phenomenon are ordinary clouds or fog which are in reality nothing more than large aggregations of dust particles upon the surfaces of which water vapor has condensed. However, when these particles are closely surrounded by a body or film of non-condensable gas, the water vapor cannot readily come in contact with the surface of the particles and therefore cannot condense upon and surround them, as in the case of particles which are suspended in an atmosphere containing substantial amounts of condensable vapor. It is, therefore, necessary in order to condense a liquid upon the surface of a particle that it shall be in an atmosphere containing a substantial proportion of a vapor, which, upon being cooled, can condense upon its surface. Therefore, it has been practically impossible to completely collect the dust resulting from various types of calcination operations, due to the fact that, although water vapor is generally present in the dust laden atmosphere emerging from the calcining device, it is maintained at such a high temperature that condensation upon the dust particles cannot ordinarily take place.

It will thus be seen that the spray of liquid as used in my invention has two functions, namely, to cool the condensable vapors emerging from the retort to a point below their condensation temperature and to provide additional moisture to completely wet the particles and carry them out of the gaseous stream. It is also necessary that water vapor or other condensable gases be present in the atmosphere of the retort for the reasons just stated and, if sufficient moisture cannot be derived from the material undergoing calcination, it is necessary to introduce additional moisture into the apparatus.

In applying the principles outlined above to the collection of dust from calcining operations according to my invention, the highly heated dust laden gaseous mixture containing water, air, carbon dioxide and other gases, passes through the apparatus in a continuous stream. The normal temperature of the operation is sufficiently high to maintain the water vapor in a gaseous state, but upon striking the relatively cold stream of liquid emerging from the spray nozzle 19, a substantial proportion of the water content immediately condenses out upon the surface of the dust particles, forming thereon a film of moisture. This film is immediately augmented by the addition of more water from the spray and the particles, being caught therein, are immediately and effectively removed from the non-condensable gases.

This invention finds particular application in the calcination and quenching of lithopone, but can also be advantageously applied in similar pigment treating operations, such as the calcination of zinc oxide, zinc sulphide, ochers and various titanium pigments. Furthermore, the invention can also be applied to many drying operations, particularly where rotary dryers are employed. Where gases are to be handled, as in the expulsion of benzene from oil seeds after extraction, a spray liquid miscible with the vapor would preferably be used.

The equipment used in carrying out this invention is to be adapted to the particular conditions under which it is used. For example, the dust collecting chamber may be of any desired shape; the chamber in which the dry calcined product first collects may be omitted if a dry product is not desired, or this chamber may be elaborated to eliminate dust escape at this point if only dry discharge is required. Although I have described my invention in connection with a rotary calcining retort, it is equally applicable to various types of stationary devices.

The spray may be one of the conventional types if ample space is available and the tendency to entrain air not objectionable. The dust chamber may be completely enclosed if visual observation is not required; or glass or other suitable windows may be provided for this purpose.

The invention may be carried out at pressures above or below atmospheric by suitable modifications in the apparatus which will be apparent to those skilled in the art. In case the granular or powdered material itself does not provide a sufficient concentration of vapor in the dust laden gases to permit successful application of this invention, such vapor may be introduced and mixed with the gases prior to their passage through the dust removing spray.

As many apparently and widely different embodiments of this invention may be made without departing from the spirit and scope thereof, it is to be understood that I do not limit myself to the specific embodiments thereof except as defined in the appended claims.

I claim:

1. In an externally heated rotary retort for the calcination and quenching of solid materials in which there is normally produced a current of dust laden gases and vapors, the combination with means for passing said solid material through a highly heated zone and discharging it therefrom, of means for removing dust from said current and quenching said solid material, comprising a receptacle rigidly mounted to rotate with said first named means, said receptacle communicating with the interior of said retort and having an outlet aperture therein for the passage of said gases, and a separately mounted nozzle adapted to throw a circular spray of dust catching liquid into the interior of said receptacle.

2. In an externally heated rotary retort for the calcination and quenching of pigments, in which a current of dust laden gases and vapors are normally produced during calcination, the combination with a rotary calcining tube adapted to cause the pigment to pass through a highly heated zone and to discharge it therefrom and having a discharge aperture therein, of a device adapted for removing dust from said current and quenching said pigment, said device being rigidly mounted on said tube to rotate therewith and comprising a receptacle communicating with and surrounding the discharge aperture of said calcining tube and adapted to receive the material discharged therefrom and also provided with a valve for intermittent discharge of said material, a second receptacle concentrically mounted on said first named receptacle and rigidly fixed to said calcining tube, and also adapted to rotate and communicate with said first named receptacle and with said tube, said second receptacle being provided with a separately mounted nozzle adapted to throw a circular spray of dust catching liquid into its interior.

3. In an apparatus for heat treating solid materials the combination of a rotating, externally heated retort, a rotating screen of water sealing the outlet of said retort and a common collector for receiving the water from said screen and the solid heat treated material from said retort.

In testimony whereof, I affix my signature.

FORD H. McBERTY.